United States Patent
Igarashi et al.

(12) 
(10) Patent No.: US 9,457,545 B2
(45) Date of Patent: Oct. 4, 2016

(54) PROCESS FOR PRODUCTION OF MULTILAYERED STRUCTURE

(75) Inventors: Takeyuki Igarashi, Kurashiki (JP); Yasuhiko Haneda, Chiyoda-ku (JP); Masahiro Kitamura, Chiyoda-ku (JP)

(73) Assignee: KURARAY CO., LTD., Kurashiki-shi (JP)

(*) Notice: Subject to any disclaimer, the term of this patent is extended or adjusted under 35 U.S.C. 154(b) by 945 days.

(21) Appl. No.: 13/643,583

(22) PCT Filed: Apr. 27, 2011

(86) PCT No.: PCT/JP2011/060297
§ 371 (c)(1), (2), (4) Date: Oct. 26, 2012

(87) PCT Pub. No.: WO2011/136287
PCT Pub. Date: Nov. 3, 2011

(65) Prior Publication Data
US 2013/0037980 A1  Feb. 14, 2013

(30) Foreign Application Priority Data

Apr. 28, 2010  (JP) ................ 2010-104029

(51) Int. Cl.
| | |
|---|---|
| B32B 27/30 | (2006.01) |
| B32B 27/18 | (2006.01) |
| B32B 27/32 | (2006.01) |
| B32B 7/12 | (2006.01) |
| B32B 27/08 | (2006.01) |

(52) U.S. Cl.
CPC ............. *B32B 27/306* (2013.01); *B32B 7/12* (2013.01); *B32B 27/08* (2013.01); *B32B 27/18* (2013.01); *B32B 27/32* (2013.01); *B32B 2270/00* (2013.01); *B32B 2307/21* (2013.01); *B32B 2439/00* (2013.01)

(58) Field of Classification Search
CPC .................................................. B32B 27/306
See application file for complete search history.

(56) References Cited

U.S. PATENT DOCUMENTS

| | | |
|---|---|---|
| 2004/0143049 A1 | 7/2004 | Onishi et al. |
| 2007/0275197 A1 | 11/2007 | Chow et al. |
| 2010/0255330 A1 | 10/2010 | Ninomiya et al. |
| 2011/0091734 A1 | 4/2011 | Kazeto |
| 2012/0009431 A1 | 1/2012 | Kazeto |
| 2012/0135256 A1 | 5/2012 | Donovan et al. |
| 2012/0196970 A1 | 8/2012 | Igarashi et al. |

FOREIGN PATENT DOCUMENTS

| | | |
|---|---|---|
| EP | 2113378 | * 4/2009 |
| EP | 2 113 378 A1 | 11/2009 |
| JP | 2004 168854 | 6/2004 |
| JP | 2009 56708 | 3/2009 |
| WO | 03 028998 | 4/2003 |
| WO | WO 2007/060086 A1 | 5/2007 |
| WO | 2009 041440 | 4/2009 |
| WO | WO 2010/141232 A2 | 12/2010 |

OTHER PUBLICATIONS

International Search Report Issued Jun. 7, 2011 in PCT/JP11/60297 Filed Apr. 27, 2011.
U.S. Appl. No. 13/637,448, filed Sep. 26, 2012, Igarashi, et al.
U.S. Appl. No. 13/638,730, filed Oct. 1, 2012, Igarashi, et al.
Extended Search Report issued Aug. 2, 2013 in European Application No. 11775068.7.

* cited by examiner

*Primary Examiner* — Larry Thrower
(74) *Attorney, Agent, or Firm* — Oblon, McClelland, Maier & Neustadt, L.L.P.

(57) ABSTRACT

Provided is a method of producing a multilayered structure, comprising the steps of: obtaining a regrind (C) by grinding a multilayered structure (B) having a layer of a resin composition (A), followed by sieving; and obtaining a multilayered structure (F) having a layer of a resin composition (E) made by melt kneading the regrind (C) and a polyolefin (D), wherein the resin composition (A) contains a polyolefin (G), a saponified ethylene-vinyl acetate copolymer (H) having an ethylene content of from 20 to 65 mol % and having a degree of saponification of vinyl acetate units of 96% or more, a saponified ethylene-vinyl acetate copolymer (I) having an ethylene content of from 68 to 98 mol % and having a degree of saponification of vinyl acetate units of 20% or more, and an antistatic agent (J), and a mass ratio (H/I) is from 0.1 to 10. According to this, using a regrind of a multilayered structure having a resin composition layer containing a polyolefin and an EVOH enables to provide a method of producing a multilayered structure that is suppressed in generation and worsening of uneven cloudiness.

20 Claims, No Drawings

PROCESS FOR PRODUCTION OF MULTILAYERED STRUCTURE

TECHNICAL FIELD

The present invention relates to a method of producing a multilayered structure having a resin composition layer containing a polyolefin and a saponified ethylene-vinyl acetate copolymer.

BACKGROUND ART

Conventionally, multilayered structures including a layer made of polyolefin, such as polyethylene and polypropylene, and a layer made of a saponified ethylene-vinyl acetate copolymer (hereinafter, may be abbreviated as an EVOH) excellent in barrier properties are widely used for various applications, particularly such as food packaging containers and fuel containers, taking advantage of their barrier properties. Such a multilayered structure is used as various molded products, such as a film, a sheet, a cup, a tray, and a bottle. At this time, there is a case that chips, defective products, and the like generated when obtaining the various molded products are collected and melt molded to be reused as at least one layer of a multilayered structure including a polyolefin layer and an EVOH layer. Such a recovery technique is useful from the perspective of the reduction of wastes and the economic efficiency and is employed widely.

However, when reusing a regrind of a multilayered structure including a polyolefin layer and an EVOH layer, gelation occurs due to thermal degradation during the melt molding or a degraded material adheres inside an extruder, and thus it used to be difficult to carry out continuous melt molding for a long period of time. Further, since such a degraded material is often mixed into a molded product, there used to be problems of generating a fish eye and generating a phase separation foreign matter (die build-up) in a molded product thus obtained. In addition, when producing a multilayered structure continuously, uneven cloudiness (partial decrease in transparency) occurs and gets worse, and thus there used to be a problem of worsening supply stability and long run workability.

As a measure to solve such problems, Patent Document 1 describes a multilayered structure having a layer made of a resin composition having an ethylene-vinyl acetate copolymer and a saponified ethylene-vinyl acetate copolymer, having an ethylene content of 70 mol % or more, blended into a regrind of a layered product including a polyolefin-based resin layer and an EVOH layer. It is considered that, in this multilayered structure, a die build-up and discoloration are suppressed to be excellent in appearance. However, in a case of producing a multilayered structure continuously, uneven cloudiness sometimes occurs and gets worse, and thus it sometimes lacks in supply stability and long run workability.

PRIOR ART DOCUMENT

Patent Document

Patent Document 1: JP 2009-97010A

SUMMARY OF THE INVENTION

Problems to be Solved by the Invention

The present invention has made to solve the above problems, and it is an object of the present invention to provide a method of producing a multilayered structure that is suppressed in generation and worsening of uneven cloudiness using a regrind of a multilayered structure having a resin composition layer containing a polyolefin and an EVOH.

Means for Solving the Problems

The above problems are solved by providing a method of producing a multilayered structure, comprising the steps of: obtaining a regrind (C) by grinding a multilayered structure (B) having a layer of a resin composition (A), followed by sieving; and obtaining a multilayered structure (F) having a layer of a resin composition (E) made by melt kneading the regrind (C) and a polyolefin (D), wherein
the resin composition (A) contains a polyolefin (G), a saponified ethylene-vinyl acetate copolymer (H) having an ethylene content of from 20 to 65 mol % and having a degree of saponification of vinyl acetate units of 96% or more, a saponified ethylene-vinyl acetate copolymer (I) having an ethylene content of from 68 to 98 mol % and having a degree of saponification of vinyl acetate units of 20% or more, and an antistatic agent (J), and
a mass ratio (H/I) of the saponified ethylene-vinyl acetate copolymer (H) to the saponified ethylene-vinyl acetate copolymer (I) is from 0.1 to 10.

At this time, it is preferred that the multilayered structure (F) is obtained that has a layer of the resin composition (E) made by melt kneading the regrind (C), the polyolefin (D), and a saponified ethylene-vinyl acetate copolymer (K) having an ethylene content of from 68 to 98 mol % and having a degree of saponification of vinyl acetate units of 20% or more. It is also preferred that the regrind (C) is obtained by grinding the multilayered structure (B), followed by sieving to eliminate particles having a particle diameter of 0.1 mm or less. It is also preferred that the regrind (C) has an apparent density of from 0.55 to 0.8 g/ml. It is also preferred that a content of the antistatic agent (J) in the regrind (C) is from 50 to 15000 ppm based on the total regrind (C). It is also preferred that the regrind (C) has a charge potential of 0 kV.

It is also preferred that the saponified ethylene-vinyl acetate copolymer (H) in the resin composition (A) has a dispersed particle diameter of 1.8 μm or less. It is also preferred that a content of the saponified ethylene-vinyl acetate copolymer (H) in the resin composition (A) is from 1 to 10 mass %.

Effects of the Invention

According to the present invention, it is possible to produce a multilayered structure that is suppressed in generation and worsening of uneven cloudiness using a regrind of a multilayered structure having a resin composition layer containing a polyolefin and an EVOH.

MODE FOR CARRYING OUT THE INVENTION

A production method of the present invention is a method of producing a multilayered structure, comprising the steps of: obtaining a regrind (C) by grinding a multilayered structure (B) having a layer of a resin composition (A), followed by sieving; and obtaining a multilayered structure (F) having a layer of a resin composition (E) made by melt kneading the regrind (C) and a polyolefin (D).

The resin composition (A) used here contains a polyolefin (G), a saponified ethylene-vinyl acetate copolymer (H) having an ethylene content of from 20 to 65 mol % and having a degree of saponification of vinyl acetate units of 96% or more (hereinafter, the copolymer (H) may be abbreviated as an EVOH (H)), a saponified ethylene-vinyl acetate copolymer (I) having a ethylene content of from 68 to 98 mol % and having a degree of saponification of vinyl acetate units of 20% or more (hereinafter, the copolymer (I) may be abbreviated as an S-EVOH (I)), and an antistatic agent (J).

The polyolefin (G) contained in the resin composition (A) contains: (low density, linear low density, medium density, high density, or the like) polyethylene; an ethylene-based copolymer obtained by copolymerizing ethylene with α-olefins, such as 1-butene, 1-hexene, and 4-methyl-1-pentene, or acrylic ester; polypropylene; a propylene-based copolymer obtained by copolymerizing propylene with α-olefins, such as ethylene, 1-butene, 1-hexene, and 4-methyl-1-pentene; poly(1-butene), poly(4-methyl-1-pentene), or modified polyolefin obtained by reacting maleic anhydride to the polyolefin described above; an ionomer resin; or the like. Among all, a polypropylene-based resin, such as polypropylene and a propylene-based copolymer, or a polyethylene-based resin, such as polyethylene and an ethylene-based copolymer, is preferred, and a polypropylene-based resin is more preferred. One type of the polyolefin (G) may be used singly, or two or more types may also be used in combination.

The EVOH (H) contained in the resin composition (A) is obtained by saponifying vinyl acetate units in an ethylene-vinyl acetate copolymer. An EVOH having a less ethylene content and having a high degree of saponification of vinyl acetate units is prone to become defective in compatibility with polyolefin. In contrast, when an EVOH has an excessively large ethylene content, the gas barrier properties decrease. In addition, an EVOH having a low degree of saponification of vinyl acetate units is prone to become defective in thermal stability of the EVOH itself. From such perspective, the EVOH (H) has an ethylene content of from 20 to 65 mol %. It is preferred that the ethylene content is 25 mol % or more. The ethylene content is preferably 55 mol % or less and more preferably 50 mol % or less. Meanwhile, the EVOH (H) has vinyl acetate units with a degree of saponification of 96% or more, preferably 98% or more, and even more preferably 99% or more. In particular, an EVOH having an ethylene content of from 20 to 65 mol % and having a degree of saponification of 99% or more is used particularly preferably in the present invention because containers excellent in gas barrier properties are obtained by using it in layers with polyolefin.

The EVOH (H) may also have another polymerizable monomer copolymerized therein as long as not inhibiting the effects of the invention, which is generally in a range of 5 mol % or less. Such polymerizable monomer may include, for example: α-olefins, such as propylene, 1-butene, 1-hexene, and 4-methyl-1-pentene; (meth)acrylic ester; unsaturated carboxylic acid, such as maleic acid, fumaric acid, and itaconic acid; alkyl vinyl ether; N-(2-dimethylaminoethyl)methacrylamide or its quaternary compounds, N-vinylimidazole or its quaternary compounds, N-vinylpyrrolidone, N,N-butoxymethyl acrylamide, vinyltrimethoxysilane, vinylmethyldimethoxysilane, vinyldimethylmethoxysilane, and the like.

The EVOH (H) has a melt index (MI; measured at 190° C., under the load of 2160 g) of preferably 0.1 g/10 minutes or more, more preferably 0.5 g/10 minutes or more. The EVOH (H) has a melt index of preferably 100 g/10 minutes or less, more preferably 50 g/10 minutes or less, and most preferably 30 g/10 minutes or less. At this time, from the perspective of dispersibility of the EVOH (E), a ratio [MI (EVOH)/MI (PO)] when the MI of the EVOH (H) is MI (EVOH) and the MI (measured at 190° C., under the load of 2160 g) of polyolefin is MI (PO) is preferably from 0.1 to 100 and more preferably from 0.3 to 50. It should be noted that, for those having a melting point around 190° C. or more than 190° C., an MI is defined as a value obtained by measuring at a plurality of temperatures of the melting point or higher under the load of 2160 g and plotting the results with reciprocals of absolute temperatures as abscissa against logarithms of melt flow rates (MFR) as ordinate in a semi-logarithmic graph for extrapolation to 190° C.

The S-EVOH (I) contained in the resin composition (A) is a saponified ethylene-vinyl acetate copolymer (I) having an ethylene content of from 68 to 98 mol % and having a degree of saponification of vinyl acetate units of 20% or more, and has a high ethylene content and an effect of significantly improving the compatibility of the polyolefin (G) and the EVOH (H). It is preferred that the S-EVOH (I) has an ethylene content of 70 mol % or more. Meanwhile, the ethylene content of the S-EVOH (I) is preferably 96 mol % or less and more preferably 94 mol % or less. The vinyl acetate units more preferably have a degree of saponification of 30% or more and even more preferably 40% or more. An upper limit of the degree of saponification is not particularly limited and may also be 99 mol % or more, and it is also possible to use one substantially having a degree of saponification of approximately 100%. When the ethylene content is less than 68 mol % or more than 98 mol %, or the vinyl acetate units have a degree of saponification of less than 20%, the effect of improving the compatibility of the polyolefin (G) and the EVOH (H) becomes insufficient.

The S-EVOH (I) has the ethylene content higher than the ethylene content of the EVOH (H). From the perspective of improving the compatibility of the polyolefin (G) and the EVOH (H), a difference between the ethylene content of the S-EVOH (I) and the ethylene content of the EVOH (H) is preferably 10 mol % or more and more preferably 20 mol % or more.

The S-EVOH (I) has an MI (measured at 190° C., under the load of 2160 g) of preferably 0.1 g/10 minutes or more, more preferably 0.5 g/10 minutes or more, and even more preferably 1 g/10 minutes or more. Meanwhile, the S-EVOH (I) has the MI of preferably 100 g/10 minutes or less, more preferably 50 g/10 minutes or less, and even more preferably 30 g/10 minutes or less. The S-EVOH (I) may also be modified with unsaturated carboxylic acid or a derivative thereof, and such unsaturated carboxylic acid or a derivative thereof may include, for example, acrylic acid, methacrylic acid, maleic acid, fumaric acid, and itaconic acid; methyl or ethyl ester of the above acids; maleic anhydride, itaconic anhydride, and the like. One type of them may be used singly, or two or more types may also be used in combination.

As the antistatic agent (J) contained in the resin composition (A), it is possible to use a compound known as being capable of blended into the resin composition (A). For example, it may include cationic antistatic agents having a cationic functional group, such as a quaternary ammonium salt, a pyridinium salt, and primary, secondary, and tertiary amino groups; anionic antistatic agents having an anionic functional group, such as sulfonate, sulfate, phosphonate, and phosphate; amphoteric antistatic agents, such as alkyl betaine and a derivative thereof, imidazoline and a derivative thereof, and alanine and a derivative thereof; nonionic antistatic agents, such as amino alcohol and a derivative thereof, glycerin and a derivative thereof, and polyethylene glycol and a derivative thereof; and ion conductive polymers obtained by polymerizing or copolymerizing a monomer having the above cationic, anionic, or amphoteric ion conductive group. One type of these antistatic agents may be used singly, or two or more types may also be used in combination.

As components contained in the resin composition (A), in addition to the polyolefin (G), the EVOH (H), the S-EVOH (I) and the antistatic agent (J) above, it is preferred to blend an ethylene-vinyl acetate copolymer (L) (hereinafter, may be abbreviated as an EVAc (L)). Blending the EVAc (L) enables to enhance the dispersibility of the EVOH (H), to obtain a ground product having a uniform ground particle diameter while grinding, and thus to suppress generation and worsening of uneven cloudiness of a multilayered structure thus obtained. The EVAc (L) may be a random copolymer obtained by polymerizing ethylene with vinyl acetate in a known method and may also be a ternary copolymer obtained by further copolymerizing another monomer and a modified EVAc obtained by modified by grafting or the like. The vinyl acetate units of the EVAc (L) are not saponified and their content is preferably from 2 to 40 mol % and more preferably from 5 to 25 mol %. When the content of vinyl acetate units is less than 2 mol % or more than 40 mol %, an effect sufficient to improve the dispersibility of the EVOH (H) may not be obtained. The EVAc (L) preferably has a melt index (MI; measured at 190° C., under the load of 2160 g) of from 0.1 to 50 g/10 minutes, more preferably from 0.5 to 30 g/10 minutes, and even more preferably from 1 to 20 g/10 minutes.

As components contained in the resin composition (A), in addition to the polyolefin (G), the EVOH (H), the'S-EVOH (I) and the antistatic agent (J) above, it is also preferred to blend a metal salt (M) of fatty acid. Blending the metal salt (M) of fatty acid facilitates suppression of generating a fish eye in a molded product obtained by reusing a regrind. The metal salt (M) of fatty acid may include a metal salt of higher aliphatic acid having a carbon number of from 10 to 26, such as lauric acid, stearic acid, myristic acid, behenic acid, and montanoic acid, particularly a metal salt of Group I, II, or III in the periodic table, which is, for example, a sodium salt, a potassium salt, a calcium salt, and a magnesium salt. It is also possible to use a zinc salt or a lead salt of the above fatty acid. Among these, a metal salt of Group II in the periodic table, such as a calcium salt and a magnesium salt, is preferred because it exhibits the effect by being added in a small amount.

Further, as the components contained in the resin composition (A), in addition to the polyolefin (G), the EVOH (H), the S-EVOH (I) and the antistatic agent (J) above, it is also preferred to blend hydrotalcite (N). Blending the hydrotalcite (N) facilitates suppression of generating a fish eye in a molded product obtained by reusing a regrind. The hydrotalcite (N) may preferably include double salt hydrotalcite (N) represented by $$M_xAl_y(OH)_{2x+3y-2z}(b)_z \cdot aH_2O$$

(m denotes one or more of Mg, Ca, Sr, Ba, Zn, Cd, Pb, and Sn, b denotes $CO_3$ or $HPO_4$, x, y, and z are positive numbers, a is 0 or a positive number, and 2x+3y−2z>0).

In the above hydrotalcite, it is preferred that m is Mg, Ca, or Zn, and more preferred that it is a combination of two or more of them. Among these hydrotalcites, examples of particularly preferred ones may be as follows:

$Mg_6Al_2(OH)_{16}CO_3 \cdot 4H_2O$;

$Mg_8Al_2(OH)_{20}CO_3 \cdot 5H_2O$;

$Mg_5Al_2(OH)_{14}CO_3 \cdot 4H_2O$;

$Mg_{10}Al_2(OH)_{22}(CO_3)_2 \cdot 4H_2O$;

$Mg_6Al_2(OH)_{16}HPO_4 \cdot 4H_2O$;

$Ca_6Al_2(OH)_{16}CO_3 \cdot 4H_2O$;

$Zn_6Al_2(OH)_{16}CO_3 \cdot 4H_2O$;

$Mg_3ZnAl_2(OH)_{12}CO_3 \cdot 2.7H_2O$;

$Mg_6Zn_2Al_2(OH)_{20}CO_3 \cdot 1.6H_2O$;

$Mg_5Zn_{1.7}Al_{3.3}(OH)_{20}(CO_3)_{1.65} \cdot 4.5H_2O$.

It is also possible to blend other additives into the resin composition (A) as long as not inhibiting the effects of the invention. Examples of such an additive may include an antioxidant, an ultraviolet absorber, a plasticizer, a lubricant, a filler, and other polymer compounds. Specific examples of the additives may include the following.

Antioxidant: 2,5-di-t-butylhydroquinone, 2,6-di-t-butyl-p-cresol, 4,4'-thiobis(6-t-butylphenol), 2,2'-methylenebis(4-methyl-6-t-butylphenol), octadecyl-3-(3',5'-di-t-butyl-4'-hydroxyphenyl)propionate, 4,4'-thiobis(6-t-butylphenol), and the like.

Ultraviolet Absorber: ethylene-2-cyano-3,3'-diphenylacrylate, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone, and the like.

Plasticizer: dimethyl phthalate, diethyl phthalate, dioctyl phthalate, wax, liquid paraffin, phosphate ester, and the like.

Lubricant: ethylene bis-stearic acid amide, butyl stearate, stearic acid, and the like.

Filler: glass fibers, asbestos, ballastnite, calcium silicate, and the like.

In addition, many other polymer compounds can also be blended into the resin composition (A) as long as not inhibiting the actions and the effects of the present invention.

It is preferred that the resin composition (A) contains from 80 to 99 mass % of the polyolefin (G). When the polyolefin (G) content is more than 99 mass %, the effects on waste reduction by recovery cannot be obtained and thus it is not preferred from the perspective of the economic efficiency. It is more preferred that the polyolefin (G) content is 98 mass % or less. In contrast, when the polyolefin (G) content is less than 80 mass %, there is a tendency to worsen the transparency of a multilayered structure thus obtained. It is more preferred that the polyolefin (G) content is 83 mass % or more.

It is preferred that the resin composition (A) contains from 1 to 10 mass % of the EVOH (H). When the EVOH (H) content is more than 10 mass %, the dispersion of the EVOH (H) becomes insufficient and variation in a ground particle diameter is prone to occur while grinding. Further, uneven cloudiness is prone to occur in a multilayered structure thus obtained. The EVOH (H) content is more preferably 9 mass % or less. In contrast, when the EVOH (H) content is less than 1 mass %, the effects on waste reduction by recovery cannot be obtained and thus it is not preferred from the perspective of the economic efficiency. It is more preferred that the EVOH (H) content is 1.5 mass % or more.

It is preferred that the resin composition (A) contains from 0.1 to 20 mass % of the S-EVOH (I). When the S-EVOH (I) content is more than 20 mass %, there is a tendency to worsen the transparency. It is more preferred that the S-EVOH (I) content is 10 mass % or less. In contrast, when the S-EVOH (I) content is less than 0.1 mass %, the dispersion of the EVOH (H) becomes insufficient and variation in a ground particle diameter is prone to occur while grinding. Further, uneven cloudiness of a multilayered structure thus obtained is prone to occur and get worse. It is more preferred that the S-EVOH (I) content is 0.5 mass % or more.

It is preferred that the resin composition (A) contains from 50 to 20000 ppm of the antistatic agent (J). When the antistatic agent (J) content is more than 20000 ppm, there is a case that surface smoothness of a multilayered structure thus obtained gets worse and the transparency decreases. It is more preferred that the antistatic agent (J) content is 15000 ppm or less. In contrast, when the antistatic agent (J) content is less than 50 ppm, the rate of composition change upon reusing a regrind sometimes becomes a problem. It is more preferred that the antistatic agent (J) content is 200 ppm or more.

It is preferred that the resin composition (A) contains from 0 to 20 mass % of the EVAc (L). When the EVAc (L) content is more than 20 mass %, there is a case that the transparency gets worse. It is more preferred that the EVAc (L) content is 18 mass % or less. In contrast, the resin composition (A) may also contain no EVAc (L). However, the EVAc (L) content is more preferably 0.1 mass % or more and even more preferably 0.5 mass % or more from the perspective of improving the dispersibility of the EVOH (H).

It is preferred that the resin composition (A) contains from 0.05 to 2 mass % of the metal salt (M) of fatty acid. When the metal salt (M) of fatty acid content is more than 2 mass %, there is a case that a fish eye derived from the non-molten metal salt (M) of fatty acid is generated. It is more preferred that the metal salt (M) of fatty acid content is 1 mass % or less. In contrast, when the metal salt (M) of fatty acid content is less than 0.05 mass %, generation of a fish eye in a molded product obtained by reusing a regrind becomes not easily suppressed. It is more preferred that the metal salt (M) of fatty acid content is 0.075 mass % or more.

It is preferred that the resin composition (A) contains from 0.05 to 2 mass % of the hydrotalcite (N). When the hydrotalcite (N) content is more than 2 mass %, there is a case that a fish eye derived from the non-molten hydrotalcite (N) is generated. It is more preferred that the hydrotalcite (N) content is 1 mass % or less. In contrast, when the hydrotalcite (N) content is less than 0.05 mass %, generation of a fish eye in a molded product obtained by reusing a regrind becomes not easily suppressed. It is more preferred that the hydrotalcite (N) content is 0.075 mass % or more.

It is required that, in the resin composition (A), the mass ratio (H/I) of the EVOH (H) to the S-EVOH (I) is from 0.1 to 10. When the mass ratio (H/I) is more than 10, the dispersion of the EVOH (H) becomes insufficient and variation in a ground particle diameter occurs while grinding. Further, uneven cloudiness of a multilayered structure thus obtained occurs and gets worse. The mass ratio (H/I) is preferably 9 or less. In contrast, in a case that the mass ratio (H/I) is less than 0.1, even when the S-EVOH (I) is added, no further effect of improving the dispersibility of the EVOH (H) is obtained. It is preferred that the mass ratio (H/I) is 0.5 or more.

It is preferred that, in the resin composition (A), mass ratio (L/I) of the EVAc (L) to the S-EVOH (I) is 15 or less. In a case that the mass ratio (L/I) is more than 15, even when the EVAc (L) is added, no further effect of improving the dispersibility of the EVOH (H) is easily obtained. It is more preferred that the mass ratio (L/I) is 13 or less. In contrast, the resin composition (A) may also contain no EVAc (L). However, the mass ratio (L/I) is preferably 0.1 mass % or more from the perspective of improving the dispersibility of the EVOH (H). It is more preferred that the mass ratio (L/I) is 1 mass % or more A mixing method to obtain the resin composition (A) is not particularly limited, and may include: a method comprising melt kneading after dry blending the polyolefin (G), the EVOH (H), the S-EVOH (I) and the antistatic agent (J) in one time; a method comprising melt kneading a portion of the polyolefin (G), the EVOH (H), the S-EVOH (I) and the antistatic agent (J) in advance, followed by blending other components thereinto and melt kneading; and a method comprising melt kneading after blending a multilayered structure containing a portion of the polyolefin (G), the EVOH (H), the S-EVOH (I) and the antistatic agent (J) into other components.

Among all, a method comprising melt kneading a scrap of collected chips and defective products generated when obtaining a molded object made of a multilayered structure, containing a layer of the polyolefin (G) and a layer of the EVOH (H), and the S-EVOH (I) and the antistatic agent (J) is preferred. Thus, the additive blended when melt kneading collected scraps is referred to as a recycling agent, and here, the S-EVOH (I) and the antistatic agent (J) are used as the recycling agents. At this time, in a case of adding another component to the S-EVOH (I) and the antistatic agent (J), it is preferred that they are melt kneaded in advance to make up a resin composition containing all of them, followed by adding it to the scraps. It is preferred that such recycling agent is blended into the scraps in the form of pellets. It is preferred that the scraps are preground into an appropriate size, and it is a preferred method of producing the resin composition (A) to dry blend the recycling agent in the form of pellets with the ground scraps, followed by melt kneading. As the scraps, scraps obtained from one molded object may be used and related scraps obtained from two or more molded objects may also be used by mixing them. Since a multilayered structure including a layer of the polyolefin (G) and a layer of the EVOH (H) usually further has a layer of an adhesive resin, the scraps thus obtained and a resin composition obtained by using them turn out to contain the adhesive resin. Here, as the adhesive resin, it is possible to preferably use a modified polyolefin resin modified with unsaturated carboxylic acid or a derivative thereof.

Further, the scraps as a raw material for the resin composition (A) may also be obtained from a multilayered structure including a regrind layer. That is, a molded product may be produced made of a multilayered structure having a regrind layer made of a resin composition obtained from a regrind and a scrap recovery of the molded product may also be used again as a raw material for a regrind layer in a similar multilayered structure.

Since there is usually no large change between the composition of a multilayered structure and the composition of scraps obtained by grinding it, the composition of the resin composition (A) made by melt kneading the scraps can approximately be calculated from the composition of the multilayered structure.

When the resin composition (A) contains components other than the polyolefin (G), the EVOH (H), the S-EVOH (I) and the antistatic agent (J), a method of blending those components is not particularly limited and they can be blended in operations similar to each component of the (G) through (J) described above. Among all, when the resin composition (A) contains the EVAc (L), the metal salt (M)

of fatty acid, or the hydrotalcite (N), it is preferred to add these components to the S-EVOH (I) and the antistatic agent (J) to use as the recycling agent. For a method of producing such recycling agent, similar methods as above are employed.

It is preferred that, in the resin composition (A) thus obtained, the polyolefin (G) has particles of the EVOH (H) dispersed in a matrix thereof, and it is preferred that the EVOH (H) in the resin composition (A) has a dispersed particle diameter of 1.8 µm or less. When the dispersed particle diameter of the EVOH (H) is more than 1.8 µm, the dispersion of the EVOH (H) becomes insufficient and variation in a ground particle diameter is prone to occur while grinding. Further, uneven cloudiness of a multilayered structure thus obtained is prone to occur and get worse. The EVOH (H) more preferably has a dispersed particle diameter of 1.5 µm or less. In contrast, while a lower limit of the average particle diameter of the EVOH (H) is not particularly limited, to make the average particle diameter of the EVOH (H) to be less than 0.1 µm is not realistic because an effect of improving the gas barrier properties is not expected that is worth the required enormous labor.

As a method of producing the multilayered structure (B) in the present invention, so-called coextrusion molding is preferred to use a number of extruders corresponding to the types of resin layer and laminate layers of the resins melt in each extruder for simultaneous extrusion molding. As another method, it is also possible to employ a molding method, such as extrusion coating and dry lamination. In addition, the multilayered structure in the present invention is subjected to a stretching operation, such as uniaxial stretching, biaxial stretching, and blow stretching, thereby also enabling to obtain a molded object having improved mechanical properties, gas barrier properties, and the like.

The multilayered structure (B) in the present invention has a layer of the resin composition (A). A preferred embodiment of the multilayered structure (B) is a multilayered structure including at least two layers of a layer made of the resin composition (A) and a layer made of a saponified ethylene-vinyl acetate copolymer (EVOH) having an ethylene content of from 20 to 65 mol % and having a degree of saponification of vinyl acetate units of 96% or more. Indicating a polyolefin as (PO) and an adhesive resin as (AD), it is possible to have a layer constitution as follows, for example. Here, as the adhesive resin, it is possible to preferably use a modified polyolefin resin modified with unsaturated carboxylic acid or a derivative thereof.
Three Layers A/AD/EVOH
Four Layers PO/A/AD/EVOH
Five Layers A/AD/EVOH/AD/A, PO/AD/EVOH/AD/A
Six Layers PO/A/AD/EVOH/AD/PO, A/PO/AD/EVOH/AD/PO,
A/PO/AD/EVOH/AD/A, PO/A/AD/EVOH/AD/A
Seven Layers PO/A/AD/EVOH/AD/A/PO As the EVOH in the multilayered structure (B), it is possible to use one same as the above description for the EVOH (H). As the polyolefin (PO), it is possible to use one same as the above description for the polyolefin (G). In a case that there is an AD layer in the multilayered structure (B), it is considered that an adhesive resin (AD) is contained in the regrind (C) of the present invention as a component.

The method of producing a multilayered structure of the present invention includes a method of producing a multilayered structure, comprising the steps of: obtaining a regrind (C) by grinding a multilayered structure (B) having a layer of a resin composition (A), followed by sieving; and obtaining a multilayered structure (F) having a layer of a resin composition (E) made by melt kneading the regrind (C) and a polyolefin (D). At this time, it is preferred that the multilayered structure (F) is obtained that has a layer of the resin composition (E) made by melt kneading the regrind (C), the polyolefin (D), and a saponified ethylene-vinyl acetate copolymer (K) having an ethylene content of from 68 to 98 mol % and having a degree of saponification of vinyl acetate units of 20% or more (hereinafter, may be abbreviated as an S-EVOH (K)).

Firstly, a description is given to the step of obtaining a regrind (C) by grinding a multilayered structure (B) having a layer of a resin composition (A), followed by sieving.

A method of grinding the multilayered structure (B) is not limited particularly, and examples of it may include a method using a grinder, such as a jaw crusher, a hammer crusher, a roll crusher, a screen mill, a jet grinder, a roller mill, and a vibration mill. By carry out sieving of the ground product thus obtained, it is enabled to obtain the regrind (C). At this time, it is preferred to eliminate particles having a particle diameter of 0.1 mm or less. Using a sieve with openings of more than 0.1 mm to eliminate fine powder, it is enabled to eliminate particles having a particle diameter of 0.1 mm or less. Here, the openings of the sieve are defined in JIS-Z8801. When the fine powder is mixed into the regrind (C), uneven cloudiness of a multilayered structure thus obtained is prone to occur and get worse. It is more preferred to eliminate particles having a particle diameter of 0.5 mm or less, and even more preferred to eliminate particles having a particle diameter of 1 mm or less. It is also preferred to eliminate particles having a particle diameter of 15 mm or more before or after eliminating the fine powder. Using a sieve with openings smaller than 15 mm to eliminate large fragments, it is enabled to eliminate particles having a particle diameter of 15 mm or more. Large fragments are, when mixed into the regrind (C), sometimes extruded from a die without melted, and the non-molten portion is prone to become a fish eye. It is more preferred to eliminate particles having a particle diameter of 10 mm or more.

It is preferred that the regrind (C) in the present invention has an apparent density of from 0.55 to 0.8 g/ml. As the regrind (C) contains the fine powder, the apparent density increases. The apparent density becomes an indicator of variation in the ground particle diameter. In a case of less than 0.55 g/ml, classification occurs caused by the variation in the ground particle diameter, and the rate of composition change upon reusing the regrind (C) sometimes becomes a problem. It is more preferred that the regrind (C) has an apparent density of 0.6 g/ml or more. In a case of more than 0.8 g/ml, uneven cloudiness of a multilayered structure thus obtained is prone to occur and get worse. It is more preferred that the regrind (C) has an apparent density of 0.78 g/ml or less.

It is preferred that a content of the antistatic agent (J) in the regrind (C) is from 50 to 15000 ppm based on the total regrind (C). In a case of less than 50 ppm, uneven cloudiness of a multilayered structure thus obtained is prone to occur and get worse. It is more preferred that the content of the antistatic agent (J) is 200 ppm or more. In a case of more than 15000 ppm, surface smoothness of a multilayered structure thus obtained is prone to get worse. It is more preferred that the content of the antistatic agent (J) is 10000 ppm or less.

It is preferred that the regrind (C) has a charge potential of 0 kV. In a case that the regrind (C) has a charge potential of more than 0 kV, composition change upon reusing becomes prone to occur and uneven cloudiness of a multilayered structure thus obtained is prone to occur and get worse.

Next, a description is given to the step of obtaining a multilayered structure (F) having a layer of a resin composition (E) made by melt kneading the regrind (C) and a polyolefin (D).

As a method of obtaining the resin composition (E) by melt kneading the regrind (C) and the polyolefin (D), it is possible to employ a method similar to the method of producing the resin composition (A). At this time, it is possible to use, for the polyolefin (D), one same as the above description for the polyolefin (G). As the S-EVOH (K), it is possible to use one same as the above description for the S-EVOH (I).

As a method of producing the multilayered structure (F), it is possible to employ a method similar to the method of producing the multilayered structure (B).

The multilayered structure (F) in the present invention has a layer of the resin composition (E). An embodiment of the multilayered structure (F) is exemplified by one having the resin composition (E) as a substitute of the resin composition (A) in the embodiment of the multilayered structure (B) described above.

The multilayered structure (F) obtained in such method is suppressed in generation and worsening of uneven cloudiness and is excellent in appearance, so that it is preferably used for various molded products, such as a film, a sheet, a cup, a tray, and a bottle.

EXAMPLES

In present Examples, the following raw materials were used. In Production Examples, Examples, and Comparative Examples below, parts are based on mass, unless otherwise specified.

[Polyolefin (D) and Polyolefin (G)]

PP-1: polypropylene [density of 0.90 g/cm$^3$, melt index of 1.4 g/10 minutes (ASTM-D 1238, 230° C., load of 2160 g)], "NOVATEC PP EA7A" produced by Japan Polypropylene Corporation

[EVOH (H)]

H-1: ethylene content of 32 mol %, degree of saponification of 99.7 mol %, limiting viscosity of 1.1 dL/g at 30° C. in aqueous phenol, density of 1.15 g/cm$^3$, melt index of 1.6 g/10 minutes (ASTM-D 1238, 230° C., load of 2160 g)

[S-EVOH (I).]

F-1: ethylene content of 89 mol %, degree of saponification of 97 mol %, melt index of 5.1 g/10 minutes (ASTM-D 1238, 190° C., load of 2160 g)

[Antistatic Agent (J)]

J-1: a fatty acid ester-based nonionic surfactant, "CHEMISTAT 1100" produced by Sanyo Chemical Industries, Ltd.

[EVAc (L)]

L-1: vinyl acetate content of 19 mass %, melt index of 2.5 g/10 minutes (ASTM-D 1238, 190° C., load of 2160 g), "EVAFLEX EV460" produced by Du Pont-Mitsui Polychemicals Co., Ltd.

[Metal Salt (M) of Fatty Acid]

M-1: calcium stearate

[Hydrotalcite (N)]

N-1: "ZHT-4A" produced by Kyowa Chemical Industry Co., Ltd.

[Others]

Adhesive Resin: density of 0.90 g/cm$^3$, melt index of 3.2 g/10 minutes (ASTM-D 1238, 230° C., load of 2160 g), "MODIC AP P604V" produced by Mitsubishi Chemical Corporation Measurements were carried out in the following methods respectively for the multilayered structure (B) obtained in Examples regarding a dispersed particle diameter of the EVOH (H) contained in a layer of the resin composition (A), an apparent density, a charge potential, and a rate of composition change after operating for one hour of the regrind (C), and uneven cloudiness of the multilayered structure (F).

[Dispersed Particle Diameter of EVOH (H) Contained in Layer of Resin Composition (A)]

A multilayered structure (B) was carefully cut with a microtome in a direction perpendicular to the sheet surface and a resin composition (A) layer was further taken out using a scalpel. Platinum was vapor deposited on the exposed cross section in a reduced pressure atmosphere. The cross section with platinum vapor deposited thereon was taken in a picture using a scanning electron microscope (SEM) with 10000 magnification, a region in this picture including approximately 20 particles of the EVOH (H) was selected, particle diameters of the respective particle images in the region were measured, and their average value was calculated to define it as a dispersed particle diameter. For the particle diameters of the respective particles, a longer diameter (longest part) of the particles observed in the picture was measured to define it as the particle diameter. The multilayered structure (B) was cut vertically in a direction of extrusion, and the picture was taken from a direction vertical to the cross section.

[Apparent Density of Regrind (C)]

It was measured according to JIS-K6891.

[Charge Potential of Regrind (C)]

In a room at 20° C. and 65% RH, 100 g of the regrind (C) was packed in a 1 L bag made of polyethylene and was stirred for one minute, followed by spreading the regrind (C) all over a petri dish made of glass having a diameter of 10 cm and a thickness of 2 cm and measurements were carried out five times from above the petri dish with an electrostatic meter (FMX-003 manufactured by Simco Japan Inc.) to calculate an average value of them.

[Rate of Composition Change in Regrind (C) After Operating for One Hour]

A dry blended mixture of 0.6 kg of the regrind (C) and 2.4 kg of PP-1 (ratio of the regrind (C) when starting an operation=20 mass %) was charged in a hopper having an inlet diameter of 20 cm, an outlet diameter of 4 cm, and a height of 22 cm for operation at a discharge of 3 kg/h. The mixture discharged from the outlet of the hopper cylinder from 59 to 60 minutes after starting the operation was collected to measure the weight remained after removing the PP-1, thereby obtaining the ratio (mass ratio) of the regrind. A rate of composition change in the mixture obtained from the following expression was defined as an indicator of classification.

Rate of Composition Change (%)=(Ratio of Regrind after Operating for One Hour−Ratio of Regrind when Starting Operation)/Ratio of Regrind when Starting Operation×100

[Uneven Cloudiness of Multilayered Structure (F)]

The multilayered structure (F) was observed respectively immediate after starting mold and one hour later to visually evaluate as follows.

A: no uneven cloudiness occurs

B: slight uneven cloudiness occurs

C: significant uneven cloudiness occurs

[Production of Ground Product (O)]

In the following methods, ground products (O-1) through (O-3) were obtained.

Ground Product (O-1)

Using PP-1 as the polyolefin (G), H-1 as the EVOH (H) for an innermost layer, "MODIC AP P604V" as the adhesive resin layers, three-type five-layer coextrusion of polyolefin layer/adhesive resin layer/EVOH layer/adhesive resin layer/polyolefin layer=200 µm/20 µm/20 µm/20 µm/200 µm was carried out with a feedblock die to prepare a multilayered structure. A thickness of each layer is shown in Table 1. The respective resins were supplied to the feedblock using a 32 mmφ extruder for the polyolefin layers, a 25 mmφ extruder for the adhesive resin layers, and a 20 mmφ extruder for the EVOH layer, respectively. It was carried out at the temperature for extrusion at 220° C. for each resin, and also at the temperatures of 220° C. in a die section and a feedblock section.

Subsequently, the multilayered structure thus obtained was ground with a grinder (SG2324S manufactured by Sanko Kiko Ltd.) having a sieve with openings of an 8 mm diameter mounted therewith to eliminate fragments having a diameter of 8 mm or more, followed by eliminating fine powder having a diameter of 3 mm or less with a vibrating sieving machine (IS-1 manufactured by Isuzu Kakoki K.K., discharge of 10 kg/h) having a sieve with openings of a 3 mm diameter mounted therewith to obtain the ground product (O-1).

Ground Product (O-2)

A multilayered structure was prepared similar to the ground product (O-1) other than defining a layer thickness of the multilayered structure used for the ground product (O-1) as polyolefin layer/adhesive resin layer/EVOH layer/adhesive resin layer/polyolefin layer=200 µm/20 µm/40 µm/20 µm/200 µm and then ground to obtain the ground product (O-2). The layer thickness of each component is put together to be shown in Table 1.

Ground Product (O-3)

A multilayered structure was prepared similar to the ground product (O-1) other than defining a layer thickness of the multilayered structure used for the ground product (O-1) as polyolefin layer/adhesive resin layer/EVOH layer/adhesive resin layer/polyolefin layer=200 µm/20 µm/200 µm/20 µm/200 µm and then ground to obtain the ground product (O-3). The layer thickness of each component is put together to be shown in Table 1.

[Production of Masterbatch]

In accordance with the following methods, masterbatches (MB1 through MB5) were obtained.

MB1

Using I-1 as the S-EVOH (I), L-1 as the EVAc (L), M-1 as the metal salt (M) of fatty acid, N-1 as the hydrotalcite (N), and J-1 as the antistatic agent (J), they were blended by dry blending to have a mass ratio of 1-1/L-1/M-1/N-1/J-1=25/66.5/5/2.5/1. A mixture thus obtained was melt kneaded at an extrusion temperature of 200° C. using a corotating twin screw extruder (TEX-30N manufactured by Japan Steel Works, Ltd.) of 30 mmφ, followed by pelletizing to obtain a masterbatch (MB1). The composition of the masterbatch is shown in Table 1.

MB2

Using I-1 as the S-EVOH (I), L-1 as the EVAc (L), M-1 as the metal salt (M) of fatty acid, N-1 as the hydrotalcite (N), and J-1 as the antistatic agent (J), they were melt kneaded in a same manner as MB1 other than blending them by dry blending to have a mass ratio of 1-1/L-1/M-1/N-1/J-1=25/5/5/2.5/62.5 to obtain a masterbatch (MB2). The composition of the masterbatch is shown in Table 1.

MB3

Using I-1 as the S-EVOH (I), L-1 as the EVAc (L), M-1 as the metal salt (M) of fatty acid, N-1 as the hydrotalcite (N), and J-1 as the antistatic agent (J), they were melt kneaded in a same manner as MB1 other than blending them by dry blending to have a mass ratio of 1-1/L-1/M-1/N-1/J-1=25/67.4/5/2.5/0.1 to obtain a masterbatch (MB3). The composition of the masterbatch is shown in Table 1.

MB4

Using I-1 as the S-EVOH (I), L-1 as the EVAc (L), M-1 as the metal salt (M) of fatty acid, N-1 as the hydrotalcite (N), and J-1 as the antistatic agent (J), they were melt kneaded in a same manner as MB1 other than blending them by dry blending to have a mass ratio of 1-1/L-1/M-1/N-1/J-1=5/84/5/5/1 to obtain a masterbatch (MB4). The composition of the masterbatch is shown in Table 1.

MB5

Using I-1 as the S-EVOH (I), L-1 as the EVAc (L), M-1 as the metal salt (M) of fatty acid, and N-1 as the hydrotalcite (N), they were melt kneaded in a same manner as MB1 other than blending them by dry blending to have a mass ratio of 1-1/L-1/M-1/N-1=25/67.5/5/2.5 to obtain a masterbatch (MB5). The composition of the masterbatch is shown in Table 1.

Example 1

Preparation of Multilayered Structure (B)

Using the resin composition (A) having PP-1 as the polyolefin (G), the ground product (O-1), and the masterbatch (MB1) blended therein at mass ratio of PP-1/ground product (O-1)/masterbatch (MB1)=70/30/3, H-1 as the EVOH (H) for an innermost layer, and "MODIC AP P604V" as the adhesive resin layers, three-type five-layer coextrusion of resin composition (A) layer/adhesive resin layer/EVOH layer/adhesive resin layer/resin composition (A) layer=200 µm/20 µm/20 µm/20 µm/200 µm was carried out with a feedblock die to prepare the multilayered structure (B). A thickness of each layer is shown in Table 1. The respective resins were supplied to the feedblock using a 32 mmφ extruder for the resin composition (A) layers, a 25 mmφ extruder for the adhesive resin layers, and a 20 mmφ extruder for the EVOH layer, respectively. The temperature for extrusion was 220° C. for each resin, and the temperatures in a die section and a feedblock section were also 220° C.

Taking the multilayered structure (B) thus obtained, a particle diameter of the EVOH (H) in the resin composition (A) layer was measured. The result is shown in Table 1.

Multilayer

[Production of Regrind (C)]

The multilayered structure obtained in the above method was ground with a grinder (SG2324S manufactured by Sanko Kiko Ltd.) having a sieve with openings of an 8 mm diameter mounted therewith to eliminate fragments having a diameter of 8 mm or more, followed by eliminating fine powder having a diameter of 3 mm or less with a vibrating sieving machine (IS-1 manufactured by Isuzu Kakoki K.K., discharge of 10 kg/h) having a sieve with openings of a 3 mm diameter mounted therewith to obtain a regrind (C-1). The content of the antistatic agent in the regrind (C-1) thus obtained was 250 ppm based on the total regrind (C-1).

The apparent density, the charge potential, and the rate of composition change after operating for one hour of the regrind (C-1) obtained as above were measured. The results are shown in Table 1.

[Production of Multilayered Structure (F)]

Using the resin composition (E) having PP-1 as the polyolefin (D), the regrind (C-1) as the regrind (C), and the masterbatch (MB1) blended therein at mass ratio of PP-1/ regrind (C-1)/masterbatch (MB1)=70/30/3, H-1 as the EVOH (H) for an innermost layer, and "MODIC AP P604V" as the adhesive resin layers, three-type five-layer coextrusion of resin composition (E) layer/adhesive resin layer/ EVOH layer/adhesive resin layer/resin composition (E) layer=200 μm/20 μm/20 μm/20 μm/200 μm was carried out with a feedblock die to prepare the multilayered structure (F). The respective resins were supplied to the feedblock using a 32 mmφ extruder for the resin composition (D) layers, a 25 mmφ extruder for the adhesive resin layers, and a 20 mmφ extruder for the EVOH layer, respectively. The temperature for extrusion was 220° C. for each resin, and the temperatures in a die section and a feedblock section were also 220° C.

During the production of the multilayered structure (F), uneven cloudiness was evaluated. The result is shown in Table 1.

Example 2

Production of Multilayered Structure (B)

The multilayered structure (B) was prepared in a same manner as Example 1 other than using the ground product (O-2) instead of the ground product (O-1) and defining the layer thickness of the multilayered structure (B) as resin composition (A) layer/adhesive resin layer/EVOH layer/ adhesive resin layer/resin composition (A) layer=200 μm/20 μm/40 μm/20 μm/200 μm in Example 1. A thickness of each layer is shown in Table 1. Taking the multilayered structure (B) thus obtained, a particle diameter of the EVOH (H) in the resin composition (A) layer was measured. The result is shown in Table 1.

[Production of Regrind (C)]

The multilayered structure (B) obtained in the above method was ground in a same manner as Example 1, followed by carrying out sieving to obtain a regrind (C-2). The content of the antistatic agent in the regrind (C-2) thus obtained was 237 ppm based on the total regrind (C-2). The apparent density, the charge potential, and the rate of composition change after operating for one hour of the regrind (C-2) obtained as above were measured. The results are shown in Table 1.

[Production of Multilayered Structure (F)]

The multilayered structure (F) was prepared in a same manner as Example 1 other than using the regrind (C-2) instead of the regrind (C-1) in Example 1 to evaluate uneven cloudiness. The result is shown in Table 1.

Example 3

Production of Multilayered Structure (B)

The multilayered structure (B) was prepared in a same manner as Example 1 other than using the masterbatch (MB2) instead of the masterbatch ground product (MB1). Taking the multilayered structure (B) thus obtained, a particle diameter of the EVOH (H) in the resin composition (A) layer was measured. The result is shown in Table 1.

[Production of Regrind (C)]

The multilayered structure (B) obtained in the above method was ground in a same manner as Example 1, followed by carrying out sieving to obtain a regrind (C-3). The content of the antistatic agent in the regrind (C-3) thus obtained was 15641 ppm based on the total regrind (C-3). The apparent density, the charge potential, and the rate of composition change after operating for one hour of the regrind (C-3) obtained as above were measured. The results are shown in Table 1.

[Production of Multilayered Structure (F)]

The multilayered structure (F) was prepared in a same manner as Example 1 other than using the regrind (C-3) instead of the regrind (C-1) and using the masterbatch (MB2) instead of the masterbatch (MB1) in Example 1 to evaluate uneven cloudiness. The result is shown in Table 1.

Example 4

Production of Multilayered Structure (B)

The multilayered structure (B) was prepared in a same manner as Example 1 other than using the masterbatch (MB3) instead of the masterbatch ground product (MB1). Taking the multilayered structure (B) thus obtained, a particle diameter of the EVOH (H) in the resin composition (A) layer was measured. The result is shown in Table 1.

[Production of Regrind (C)]

The multilayered structure (B) obtained in the above method was ground in a same manner as Example 1, followed by carrying out sieving to obtain a regrind (C-4). The content of the antistatic agent in the regrind (C-4) thus obtained was 25 ppm based on the total regrind (C-3). The apparent density, the charge potential, and the rate of composition change after operating for one hour of the regrind (C-4) obtained as above were measured. The results are shown in Table 1.

[Production of Multilayered Structure (F)]

The multilayered structure (F) was prepared in a same manner as Example 1 other than using the regrind (C-4) instead of the regrind (C-1) and using the masterbatch (MB3) instead of the masterbatch (MB1) in Example 1 to evaluate uneven cloudiness. The result is shown in Table 1.

Comparative Example 1

Production of Multilayered Structure (B)

The multilayered structure (B) was prepared in a same manner as Example 1 other than using the masterbatch (MB4) instead of the masterbatch ground product (MB1). Taking the multilayered structure (B) thus obtained, a particle diameter of the EVOH (H) in the resin composition (A) layer was measured. The result is shown in Table 1.

[Production of Regrind (C)]

The multilayered structure (B) obtained in the above method was ground in a same manner as Example 1, followed by carrying out sieving to obtain a regrind (C-5). The content of the antistatic agent in the regrind (C-5) thus obtained was 250 ppm based on the total regrind (C-5). The apparent density, the charge potential, and the rate of composition change after operating for one hour of the regrind (C-5) obtained as above were measured. The results are shown in Table 1.

[Production of Multilayered Structure (F)]

The multilayered structure (F) was prepared in a same manner as Example 1 other than using the regrind (C-5)

instead of the regrind (C-1) and using the masterbatch (MB4) instead of the masterbatch (MB1) in Example 1 to evaluate uneven cloudiness. The result is shown in Table 1.

Comparative Example 2

Production of Regrind (C)

Using the multilayered structure (B) obtained in Example 1, it was ground in a same manner as Example 1. After that, without carrying out sieving, a regrind (C-6) was obtained. The content of the antistatic agent in the regrind (C-6) thus obtained was 250 ppm based on the total regrind (C-6). The apparent density, the charge potential, and the rate of composition change after operating for one hour of the regrind (C-6) obtained as above were measured. The results are shown in Table 1.
[Production of Multilayered Structure (F)]

The multilayered structure (F) was prepared in a same manner as Example 1 other than using the regrind (C-6) instead of the regrind (C-1) in Example 1 to evaluate uneven cloudiness. The result is shown in Table 1.

Comparative Example 3

Production of Multilayered Structure (B)

The multilayered structure (B) was prepared in a same manner as Example 1 other than using the masterbatch (MB5) instead of the masterbatch ground product (MB1). Taking the multilayered structure (B) thus obtained, a particle diameter of the EVOH (H) in the resin composition (A) layer was measured. The result is shown in Table 1.
[Production of Regrind (C)]

The multilayered structure (B) obtained as above was ground in a same manner as Example 1, followed by carrying out sieving to obtain a regrind (C-7). The content of the antistatic agent in the regrind (C-7) thus obtained was 0 ppm based on the total regrind (C-7). The apparent density, the charge potential, and the rate of composition change after operating for one hour of the regrind (C-7) obtained as above were measured. The results are shown in Table 1.
[Production of Multilayered Structure (F)]

The multilayered structure (F) was prepared in a same manner as Example 1 other than using the regrind (C-7) instead of the regrind (C-1) and using the masterbatch (MB5) instead of the masterbatch (MB1) in Example 1 to evaluate uneven cloudiness. The result is shown in Table 1.

Comparative Example 4

Production of Multilayered Structure (B)

The multilayered structure (B) was prepared in a same manner as Example 1 other than using the ground product (O-3) instead of the ground product (O-1) and defining the layer thickness of the multilayered structure (B) as resin composition (A) layer/adhesive resin layer/EVOH layer/adhesive resin layer/resin composition (A) layer=200 μm/20 μm/200 μm/20 μm/200 μm in Example 1. A thickness of each layer is shown in Table 1. Taking the multilayered structure (B) thus obtained, a particle diameter of the EVOH (H) in the resin composition (A) layer was measured. The result is shown in Table 1.
[Production of Regrind (C)]

The multilayered structure (B) obtained as above was ground in a same manner as Example 1, followed by carrying out sieving to obtain a regrind (C-8). The content of the antistatic agent in the regrind (C-8) thus obtained was 167 ppm based on the total regrind (C-2). The apparent density, the charge potential, and the rate of composition change after operating for one hour of the regrind (C-8) obtained as above were measured. The results are shown in Table 1.
[Production of Multilayered Structure (F)]

The multilayered structure (F) was prepared in a same manner as Example 1 other than using the regrind (C-8) instead of the regrind (C-1) in Example 1 to evaluate uneven cloudiness. The result is shown in Table 1.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Ground Product (O) | | | | | | | | |
| | Ground Product (O-1) | Ground Product (O-2) | Ground Product (O-1) | Ground Product (O-1) | Ground Product (O-1) | Ground Product (O-1) | Ground Product (O-1) | Ground Product (O-3) |
| Thickness of Polyolefin (G) Layer (μm) | 400 | 400 | 400 | 400 | 400 | 400 | 400 | 400 |
| Thickness of EVOH (H) Layer (μm) | 20 | 40 | 20 | 20 | 20 | 20 | 20 | 200 |
| Thickness of Adhesive Resin (AD) Layer (μm) | 40 | 40 | 40 | 40 | 40 | 40 | 40 | 40 |
| Masterbatch (MB) | | | | | | | | |
| | MB1 | MB1 | MB2 | MB3 | MB4 | MB1 | MB5 | MB1 |
| S-EVOH (I) | 25 | 25 | 25 | 25 | 5 | 25 | 25 | 25 |
| EVAc (L) | 66.5 | 66.5 | 5 | 67.4 | 84 | 66.5 | 67.5 | 66.5 |
| Metal Salt (M) of Fatty Acid | 5 | 5 | 5 | 5 | 5 | 5 | 5 | 5 |
| Hydrotalcite (N) | 2.5 | 2.5 | 2.5 | 2.5 | 5 | 2.5 | 2.5 | 2.5 |
| Antistatic Agent (J) | 1 | 1 | 62.5 | 0.1 | 1 | 1 | 0 | 1 |
| Total | 100 | 100 | 100 | 100 | 100 | 100 | 100 | 100 |
| Resin Composition (A) | | | | | | | | |
| Polyolefin (G) | 95.8 | 94.4 | 95.8 | 95.8 | 95.8 | 95.8 | 95.8 | 87.3 |
| EVOH (H) | 1.6 | 3.1 | 1.6 | 1.6 | 1.6 | 1.6 | 1.6 | 11 |
| Adhesive Resin (AD) | 2.6 | 2.4 | 2.6 | 2.6 | 2.6 | 2.6 | 2.6 | 1.7 |

TABLE 1-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| S-EVOH (I) | 0.75 | 0.75 | 0.75 | 0.75 | 0.15 | 0.75 | 0.75 | 0.75 |
| EVAc (L) | 2 | 2 | 0.15 | 2.02 | 2.52 | 2 | 2.03 | 2 |
| Metal Salt (M) of Fatty Acid | 0.15 | 0.15 | 0.15 | 0.15 | 0.15 | 0.15 | 0.15 | 0.15 |
| Hydrotalcite (N) | 0.075 | 0.075 | 0.075 | 0.075 | 0.15 | 0.075 | 0.075 | 0.075 |
| Antistatic Agent (J) | 0.03 | 0.03 | 1.88 | 0.003 | 0.03 | 0.03 | 0 | 0.03 |
| (H)/(I) | 2.2 | 4.2 | 2.2 | 2.2 | 11 | 2.2 | 2.2 | 14.7 |
| Particle Diameter of EVOH (H) (μm) | 1.2 | 1.2 | 1.2 | 1.2 | 2.1 | 1.2 | 1.2 | 2.3 |
| Content of EVOH (H) | 1.6 | 3 | 1.6 | 1.6 | 1.6 | 1.6 | 1.6 | 10.7 |
| Multilayered Structure (B) | | | | | | | | |
| Thickness of Resin Composition (A) Layer (μm) | 400 | 400 | 400 | 400 | 400 | 400 | 400 | 400 |
| Thickness of EVOH Layer (μm) | 20 | 40 | 20 | 20 | 20 | 20 | 20 | 200 |
| Thickness of Adhesive Resin (AD) Layer (μm) | 40 | 40 | 40 | 40 | 40 | 40 | 40 | 40 |
| Regrind (C) | | | | | | | | |
|  | Regrind (C-1) | Regrind (C-2) | Regrind (C-3) | Regrind (C-4) | Regrind (C-5) | Regrind (C-6) | Regrind (C-7) | Regrind (C-8) |
| Sieving Step | Carried Out | Carried Out | Carried Out | Carried Out | Carried Out | Not Carried Out | Carried Out | Carried Out |
| Apparent Density (g/ml) | 0.66 | 0.69 | 0.75 | 0.66 | 0.82 | 0.85 | 0.66 | 0.91 |
| Amount of Antistatic Agent (ppm) | 250 | 237 | 15641 | 25 | 250 | 250 | 0 | 167 |
| Charge Potential (kV) | 0 | 0 | 0 | 10.2 | 0 | 0 | 19.2 | 0 |
| Rate of Composition Change (%) | 1 | 1 | 4 | 14 | 6 | 29 | 35 | 12 |
| Multilayered Structure (F) | | | | | | | | |
| Uneven Cloudiness Immediate after Starting Mold | A | A | B | A | B | B | A | C |
| Uneven Cloudiness One Hour Later | A | A | B | B | C | C | C | C |

From the results in Table 1, it is understood that all of the multilayered structures (F) obtained by the production methods in Examples 1 through 4, including the steps of: obtaining a regrind (C) by grinding a multilayered structure (B) having a layer of a resin composition (A), followed by sieving; and obtaining a multilayered structure (F) having a layer of a resin composition (E) made by melt kneading the regrind (C) and a polyolefin (D), wherein the resin composition (A) contains the polyolefin (G), the EVOH (H), the S-EVOH (I), and the antistatic agent (J), and the mass ratio (H/I) of the EVOH (H) to the S-EVOH (I) is from 0.1 to 10, were suppressed in generation and worsening of uneven cloudiness. In Example 3, due to the worsening in the surface smoothness, the slight uneven cloudiness occurred in the multilayered structure (F). In Example 4, due to the composition change upon reusing the regrind, the uneven cloudiness in the multilayered structure (F) got worse slightly.

In all of Comparative Examples 1 and 4 having the large mass ratio (H/I) of the EVOH (H) to the S-EVOH (I), Comparative Example 2 without the sieving step, and Comparative Example 3 with the resin composition (A) not containing the antistatic agent (J), uneven cloudiness occurred a lot or got worse significantly. In Comparative Example 1 and 4, due to the occurrence of composition change upon reusing the regrind in addition to the insufficient dispersibility of the EVOH (H), uneven cloudiness of the multilayered structure (F) occurred and got worse. In Comparative Examples 2 and 3, due to the significant composition change upon reusing the regrind, uneven cloudiness of the multilayered structure (F) got worse significantly.

The invention claimed is:

1. A method of producing a multilayered structure, the method comprising:
   grinding a first multilayered structure comprising a layer of a first resin composition to obtain a regrind;
   sieving the regrind to provide a sieved regrind; and
   melt kneading the sieved regrind and a second polyolefin to obtain a second multilayered structure comprising a layer of a second resin composition,
   wherein
   the first resin composition comprises a first polyolefin, a first saponified ethylene-vinyl acetate copolymer having an ethylene content of from 20 to 65 mol % and having a degree of saponification of a vinyl acetate unit of 96% or more, a second saponified ethylene-vinyl acetate copolymer having an ethylene content of from 68 to 98 mol % and having a degree of saponification of a vinyl acetate unit of 20% or more, and an antistatic agent, and
   a mass ratio of the first saponified ethylene-vinyl acetate copolymer to the second saponified ethylene-vinyl acetate copolymer is in a range from 0.1 to 10.

2. The method of claim 1, wherein the melt kneading comprises melt kneading the sieved regrind, the second polyolefin, and a third saponified ethylene-vinyl acetate copolymer having an ethylene content of from 68 to 98 mol % and having a degree of saponification of a vinyl acetate unit of 20% or more.

3. The method of claim 1, wherein the sieving removes particles having a particle diameter of 0.1 mm or less.

4. The method of claim 1, wherein the sieved regrind has an apparent density of from 0.55 to 0.8 g/ml.

5. The method of claim 1, wherein a content of the antistatic agent in the sieved regrind is from 50 to 15000 ppm based on a total amount of the sieved regrind.

6. The method of claim 1, wherein the sieved regrind has a charge potential of 0 kV.

7. The method of claim 1, wherein the first saponified ethylene-vinyl acetate copolymer in the first resin composition has a dispersed particle diameter of 1.8 µm or less.

8. The method of claim 1, wherein a content of the first saponified ethylene-vinyl acetate copolymer in the first resin composition is from 1 to 10 mass %.

9. The method of claim 1, wherein the first polyolefin comprises polyethylene, polypropylene, or both.

10. The method of claim 1, wherein the first saponified ethylene-vinyl acetate copolymer has an ethylene content of 25 to 55 mol %.

11. The method of claim 1, wherein the first saponified ethylene-vinyl acetate copolymer has a degree of saponification of a vinyl acetate unit of 99% or more, and wherein the second saponified ethylene-vinyl acetate copolymer has a degree of saponification of a vinyl acetate unit of 40% or more.

12. The method of claim 1, wherein the second saponified ethylene-vinyl acetate copolymer has an ethylene content of 70 to 96 mol %.

13. The method of claim 1, wherein the first resin composition comprises 80 to 99 mass % of the first polyolefin.

14. The method of claim 1, wherein a content of the first saponified ethylene-vinyl acetate copolymer in the first resin composition is 1.5 to 9 mass %, and wherein a content of the second saponified ethylene-vinyl acetate copolymer in the first resin composition is 0.1 to 10 mass %.

15. The method of claim 1, wherein the sieving removes particles having a particle diameter of 0.1 mm or less, the sieved regrind has an apparent density of from 0.55 to 0.8 g/ml, and a content of the antistatic agent in the sieved regrind is from 50 to 15000 ppm based on a total amount of the sieved regrind.

16. The method of claim 2, wherein the sieving removes particles having a particle diameter of 0.1 mm or less, the sieved regrind has an apparent density of from 0.55 to 0.8 g/ml, and a content of the antistatic agent in the sieved regrind is from 50 to 15000 ppm based on a total amount of the sieved regrind.

17. The method of claim 1, wherein the first polyolefin and the second polyolefin are the same.

18. The method of claim 2, wherein the first polyolefin and the second polyolefin are the same.

19. The method of claim 15, wherein the first polyolefin and the second polyolefin are the same.

20. The method of claim 16, wherein the first polyolefin and the second polyolefin are the same.

* * * * *